United States Patent [19]
Wait, Jr.

[11] 3,742,684
[45] July 3, 1973

[54] AIR FILTER MOUNTING ASSEMBLY
[75] Inventor: John D. Wait, Jr., Peoria, Ill.
[73] Assignee: Caterpillar Tractor Co., Peoria, Ill.
[22] Filed: Aug. 25, 1971
[21] Appl. No.: 175,000

Related U.S. Application Data
[62] Division of Ser. No. 9,583, Feb. 9, 1970, Pat. No. 3,670,808.

[52] U.S. Cl.................. 55/385, 55/267, 55/429, 55/507
[51] Int. Cl............................................ B01d 27/08
[58] Field of Search.................. 55/267, 385, 429, 55/507; 98/2.14, 2.15, 13, 40 D

[56] References Cited
UNITED STATES PATENTS
3,392,512   7/1968   Ziolko et al. ..................... 55/472
3,555,846   1/1971   Harbeck et al. ..................... 165/42

Primary Examiner—Bernard Nozick
Attorney—Fryer, Tjensvold, Feix, Phillips & Lempio

[57] ABSTRACT

A combined heating and air-conditioning system is provided with a heater coil and evaporator coil located back to back in a single housing enabling the use of common controls and common duct system for both heating and cooling. The heater coil is placed ahead of the evaporator coil in the air flow so that air may be heated and dehumidified on cool, humid days and warm air from the heater may be used to prevent the evaporator coil from frosting over.

3 Claims, 3 Drawing Figures

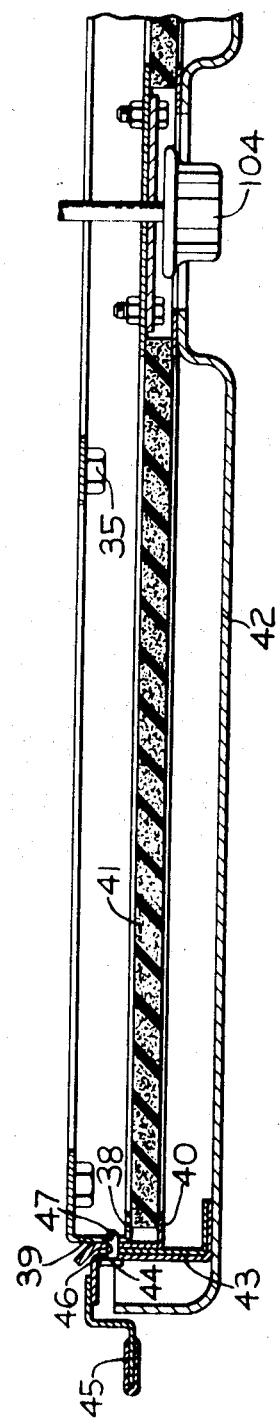

AIR FILTER MOUNTING ASSEMBLY

This application is a division of application Ser. No. 9,583, filed Feb. 9, 1970, now U.S. Pat. No. 3,670,808.

BACKGROUND OF THE INVENTION

The present invention relates to environmental control systems for motor vehicles and the like, and pertains more particularly to an air filter mounting assembly for a combined heating air-conditioning system for motor vehicles in the earthmoving industry.

Severe climatic conditions often hamper earthworking and earthmoving operations. Much of such interference is due to the effect of such conditions on the operator of earthworking machinery. For this reason the recent trend in the earthmoving industry is to provide environmental control cabs in many of the earthmoving vehicles to permit operation in all types of weather and improve the comfort and efficiency of the operator. Heretofore the equipment manufacturer has generally supplied the heater while completely separate air-conditioning units were supplied by other manufacturers who specialize in such equipment. This results in a duplication of controls, motors and fans and increases the overall cost of providing heating and air conditioning to the vehicle. Such multiple units also consume valuable space in and around the chassis of the vehicle.

SUMMARY OF THE INVENTION

Accordingly it is the primary object of the present invention to overcome the above objections of the prior art by providing a system that incorporates both heating and cooling in one system to control the temperature and humidity in the cab of an earthmoving motor vehicle.

In accordance with a primary aspect of the present invention the heating coils and cooling coils for controlling the temperature and humidity of the air in the cab of a vehicle are placed in the same housing and a common air circulating system is used so that duplicate controls and duct sytems are eliminated.

The air circulating system includes an opening in the roof of the cab of the vehicle and an air filter held in place over the opening by detachable holder means including a dust pan;

BRIEF DESCRIPTION OF THE DRAWINGS

The above and other objects and advantages of the present invention will become apparent from the following specification when read in conjunction with the accompanying drawings in which:

FIG. 3 is a fragmentary elevational view in section of the filter and holder means of the present invention taken along lines III—III of FIG. 2;

DETAILED DESCRIPTION OF THE DRAWINGS

Figure 1:
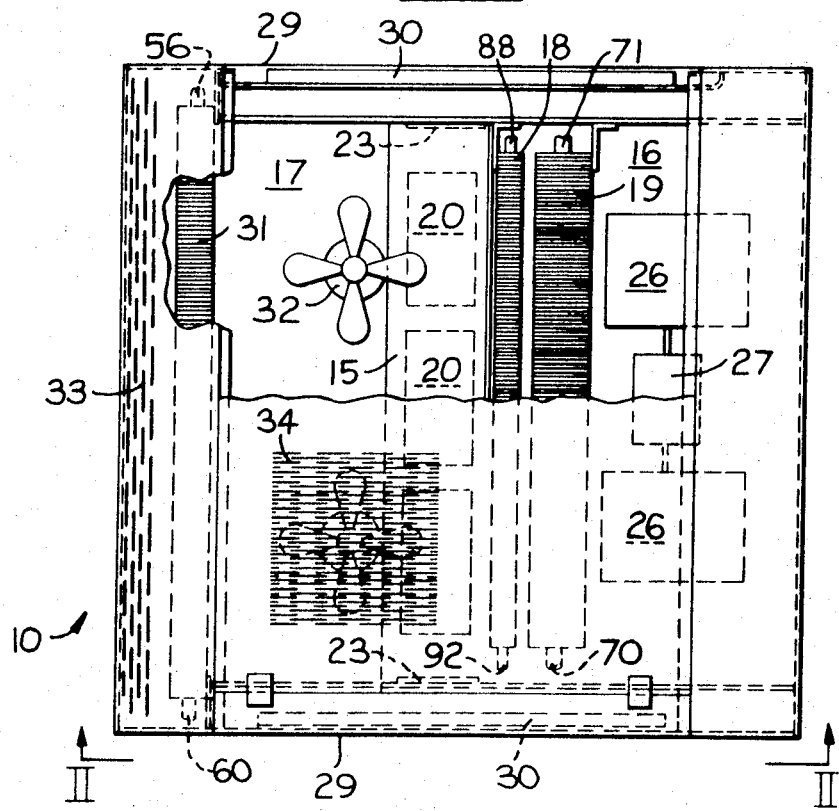
FIG. 1 is a schematic plan view of the system of the present invention.
Figure 2:
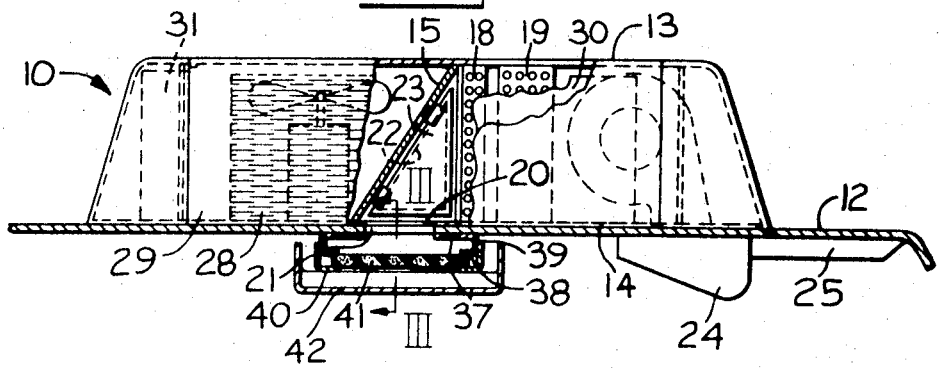
FIG. 2 is a partially sectioned schematic elevational view of the system viewed generally along lines II—II of FIG. 1.

Referring now to the drawings, and more particularly to FIGS. 1 and 2, there is illustrated a preferred embodiment of the main air-conditioning unit generally designated by the numeral 10 shown mounted on the roof 12 of a tractor cab or other construction or earthworking machinery. The cab of the vehicle normally forms a closed, or at least encloseable, operator compartment in which the operator normally sits to manipulate the controls of the vehicle or equipment. The main air-conditioning unit 10, although illustrated as being preferably mounted on the roof of the vehicle cab, may optionally be mounted at other positions such as the side or the rear of the operator compartment. The term "air-conditioning" is used herein in its broadest sense to mean the treatment of air in any manner, such as heating, cooling, dehumidifying, or filtering, or any combination of these. The main air-conditioning unit 10 comprises a housing 13 enclosed by a bottom wall 14 and divided by a means of an intermediate sloping wall 15 into a forward compartment 16 and a rear compartment 17. The forward compartment 16 may be referred to as an air-conditioning or air treatment chamber and contains a heater coil 18 and a cooler or evaporator coil 19. The heater coil 18 is connected to a heat source such as to a conventional liquid coolant circulating system wherein heated coolant such as water from the engine block is directed therethrough.

The cooling coil 19 is the evaporator coil of a conventional refrigeration system as will be more fully explained later.

A plurality of inlet openings 20 formed in bottom wall 14 cooperate with openings 21 in roof 12 to admit air from the operator compartment into chamber 16. Other inlet openings 22 provided with a closure means 23 are provided for admitting outside air into chamber 16. An opening or plurality of openings (not shown) are provided at the forward end of the chamber 16 for discharging into conventional distributor ducts (not shown) housed in console 24 and defroster duct 25. A pair of blowers 26 driven by a motor 27 are provided for forcing air through the air-conditioning chamber 16. Outside air enters the unit through a grill 28 in side covers 29 and passes through filters 30 and through inlet openings 22 into chamber 16 where it is mixed with recirculated air entering through inlet openings 20 as it passes through the chamber 16.

The rear chamber 17 contains a condensor coil 31 of the refrigerating system and a pair of fans 32. The fans 32 draw outside air through a grill 33 at the rear of the housing 13 which flows through the condenser coil 31 for cooling, and is then discharged through grills 34 on the top cover. The fans 32 may be thermostatically controlled so as to force air through condensor coil 31 only when needed for the cooling thereof. When the air-conditioning unit 10 is mounted on a relatively high speed vehicle it is preferably mounted such that grill 33 faces forward so that cool air as a result of movement of the vehicle may pass through condenser coil 31 for cooling.

In order to obtain maximum heating or cooling, the air within the operator compartment is recirculated through the air-conditioning chamber. The recirculated air is filtered before entering the inlet openings 20 passing through the air-conditioning chamber 16 and being discharged through the duct systems 24 and 25.

The filter arrangement (FIGS. 2 and 3) comprises a support bracket having an attachment flange 37 adapted to fit around inlet openings 21 in roof 12 and be attached thereto in any well known manner, such as by bolts or screws 35. A spacer flange 38 is supported in spaced relation to the attachment flange 37 by means of side walls 39. A filter holder 40 is adapted to engage the periphery 39 of the support bracket and hold a filter element 41 into engagement with spacer flange 38. The filter holder 40 and a dust pan 42, which may be formed as a unit, are held in place by releasable attaching means. The attaching means comprises a plurality of spring clips, each of which comprises a spring clip 43 attached to dust pan 42 and carrying a pin 44 and a lever or handle 45. The pin 44 is biased by means of spring 43 into cooperative engagement with aligned holes or detent means 46 and 47 in holder 40 and bracket side wall 39 respectively. To remove the filter arrangement, the operator supports the tray 42 with the heel of his hands and pulls downward on the lever 45 with his fingers. The levers being attached to spring clips 43 disengage the pins 44 from the bracket 39, thereby allowing the tray and filter to be removed as a unit. The tray catches any dirt or dust jarred loose from the filter so that it does not fall on the operator. The filter can then be easily removed from the tray for cleaning or replacing. Since the filters are located above the operator, the tray serves another function by catching the dirt or dust jarred from the filter when the tractor is operating on rough terrain.

What is claimed is:

1. An air filter mounting assembly for a vehicle air-conditioning system wherein air flow is through opening means in the roof of said vehicle, said filter mounting comprising:
   a. a support bracket fitted about said opening means in the roof of said vehicle;
   b. said bracket comprising an attachment flange attached to said roof and a spacer flange connected to and spaced from said attachment flange for supporting a filter element spaced from said opening means;
   c. a filter holder means holding a filter element engaging the periphery of said support bracket and holding said filter element in engagement with said spacer flange;
   d. a dust pan secured to said holder means and extending below and around the periphery of said filter element and said holder means;
   e. attaching means releasably attaching said dust pan and said filter holder means to said support bracket;
   f. said attaching means comprises a plurality of spring clips including means carried by said dust pan;
   g. each of said clips operatively engaging aligned detent means in said support bracket and holder means.

2. The air filter assembly of claim 1 wherein said roof and said opening means lie in a horizontal plane; and, said filter element and said dust pan lie in parallel horizontal planes below said roof.

3. The air filter assembly of claim 2 wherein the portions of said dust pan extending around the periphery of said filter and said holder means comprises upward side walls terminating above said filter element in spaced relation to said roof to permit air flow toward said filter element; and,
   the air flow through said filter element is from the direction of said dust pan toward said opening means.

* * * * *